US009870144B2

(12) United States Patent
Karoji

(10) Patent No.: US 9,870,144 B2
(45) Date of Patent: Jan. 16, 2018

(54) GRAPH DISPLAY APPARATUS, GRAPH DISPLAY METHOD AND STORAGE MEDIUM

(71) Applicant: CASIO COMPUTER CO., LTD., Tokyo (JP)

(72) Inventor: Kosuke Karoji, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/833,570

(22) Filed: Aug. 24, 2015

(65) Prior Publication Data

US 2016/0063674 A1 Mar. 3, 2016

(30) Foreign Application Priority Data

Aug. 26, 2014 (JP) ................. 2014-171879

(51) Int. Cl.
*G09G 5/14* (2006.01)
*G06F 3/0488* (2013.01)
*G05B 15/02* (2006.01)
*G06F 3/0484* (2013.01)
*G06F 3/0485* (2013.01)

(52) U.S. Cl.
CPC ......... *G06F 3/04883* (2013.01); *G05B 15/02* (2013.01); *G06F 3/0485* (2013.01); *G06F 3/04845* (2013.01); *G06F 2203/04806* (2013.01); *G06F 2203/04808* (2013.01)

(58) Field of Classification Search
CPC .................................................. G06F 3/0481
USPC ........................................................ 345/665
See application file for complete search history.

(56) References Cited

U.S. PATENT DOCUMENTS

| 5,289,394 | A | * | 2/1994 | Lapeyre | G06F 3/02 708/142 |
| 5,365,254 | A | * | 11/1994 | Kawamoto | G06F 11/322 345/157 |
| 6,064,401 | A | * | 5/2000 | Holzman | G06F 3/0485 345/440 |
| 6,330,009 | B1 | * | 12/2001 | Murasaki | G06F 3/0485 345/684 |
| 6,847,382 | B2 | * | 1/2005 | Chong | G06F 3/0481 345/441 |
| 2001/0002126 | A1 | * | 5/2001 | Rosenberg | A63F 13/06 345/156 |

(Continued)

FOREIGN PATENT DOCUMENTS

JP S62-186347 A 8/1987
JP 2004-126759 A 4/2004

*Primary Examiner* — Javid A Amini
(74) *Attorney, Agent, or Firm* — Scully, Scott, Murphy & Presser, P.C.

(57) ABSTRACT

A graph display apparatus includes a display unit and a processor. The display unit includes a touch panel. The processor performs the following processes: controlling the display unit to display a graph on a graph display area in a coordinate range, the graph corresponding to an expression; acquiring a position designated by a touch of a user on the graph display area; and when a drag operation is detected after the touch of the user ends, changing the coordinate range with the designated position fixed in response to the drag operation, thereby reducing or enlarging the graph, and controlling the display unit to display the reduced or enlarged graph.

11 Claims, 13 Drawing Sheets

(56) References Cited

U.S. PATENT DOCUMENTS

| | | | | |
|---|---|---|---|---|
| 2002/0044160 | A1* | 4/2002 | Wattenberg | G06F 3/0481 |
| | | | | 715/764 |
| 2004/0223002 | A1* | 11/2004 | Fukaya | G06F 1/1626 |
| | | | | 345/619 |
| 2004/0227738 | A1* | 11/2004 | Sudoh | G06F 3/0481 |
| | | | | 345/173 |
| 2008/0203072 | A1* | 8/2008 | Hedenfalk | B23K 9/0216 |
| | | | | 219/124.1 |
| 2008/0270936 | A1* | 10/2008 | Bebrisson | G06F 3/0481 |
| | | | | 715/788 |
| 2009/0174667 | A1* | 7/2009 | Kocienda | G06F 3/0237 |
| | | | | 345/169 |
| 2009/0307587 | A1* | 12/2009 | Kaneko | G06F 3/0486 |
| | | | | 715/700 |
| 2009/0327195 | A1* | 12/2009 | Iscen | G06N 5/042 |
| | | | | 706/47 |
| 2011/0090227 | A1* | 4/2011 | De Brebisson | G06F 3/04812 |
| | | | | 345/440 |
| 2011/0227946 | A1* | 9/2011 | Yoshizawa | G06F 15/02 |
| | | | | 345/636 |
| 2011/0234596 | A1* | 9/2011 | Okano | G06F 15/02 |
| | | | | 345/440 |
| 2012/0256858 | A1* | 10/2012 | Sudo | G06F 3/016 |
| | | | | 345/173 |
| 2013/0162569 | A1* | 6/2013 | Sudo | G06F 3/04845 |
| | | | | 345/173 |
| 2014/0289672 | A1* | 9/2014 | Uejima | G06F 3/0488 |
| | | | | 715/784 |
| 2014/0365954 | A1* | 12/2014 | Yoshizawa | G06F 3/0485 |
| | | | | 715/784 |
| 2016/0004423 | A1* | 1/2016 | Springer | G06F 3/14 |
| | | | | 715/863 |

\* cited by examiner

FIG. 3

| TOUCH-POSITION/ OBJECT | TOUCH OPERATION | REDUCING/ENLARGING PROCESS |
|---|---|---|
| LEFT END | • → | ENLARGING IN X DIRECTION WITH LEFT END FIXED |
| LEFT END | ← • | REDUCING IN X DIRECTION WITH LEFT END FIXED |
| LEFT END | ← • | REDUCING IN X DIRECTION WITH LEFT END FIXED (DISPLAY SIZE IS ALSO REDUCED) |
| Y AXIS | • → ← • | REDUCING WITH REFERENCE TO Y AXIS |
| Y AXIS | ← • • → | ENLARGING WITH REFERENCE TO Y AXIS |
| – | • → ← • | REDUCING WITH REFERENCE TO CENTER OF SCREEN |
| – | ← • • → | ENLARGING WITH REFERENCE TO CENTER OF SCREEN |

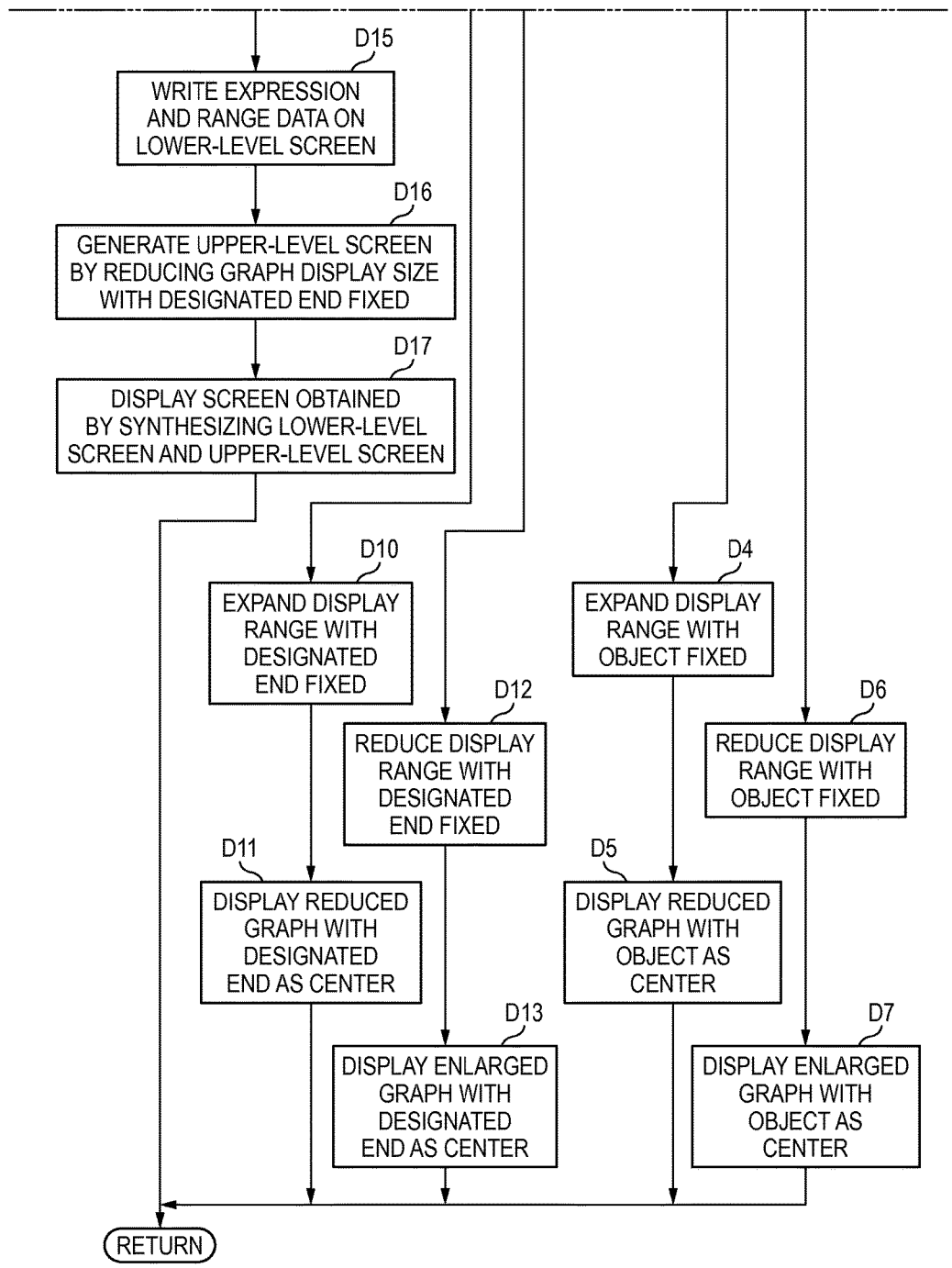

FIG. 7A
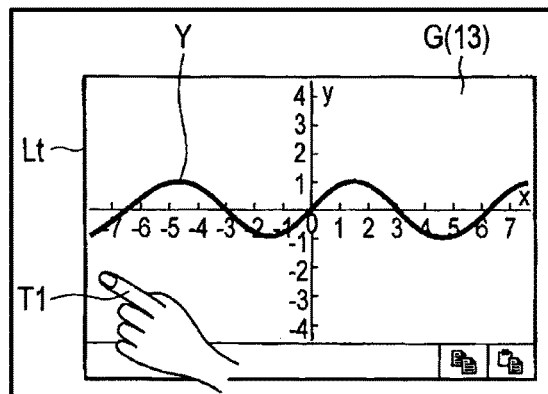
(A1)
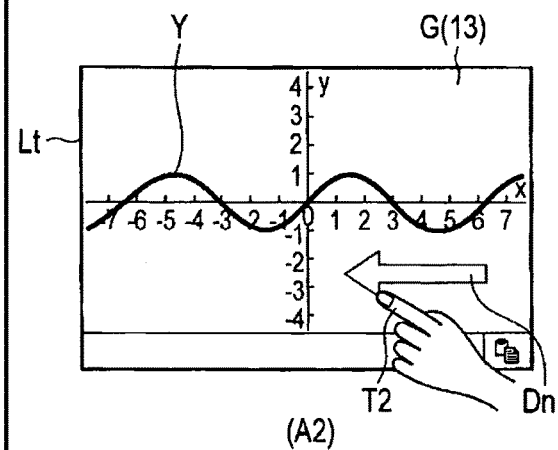
(A2)
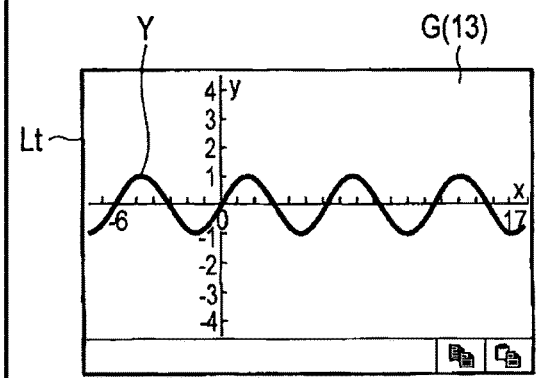
(A3)
FIG. 7B
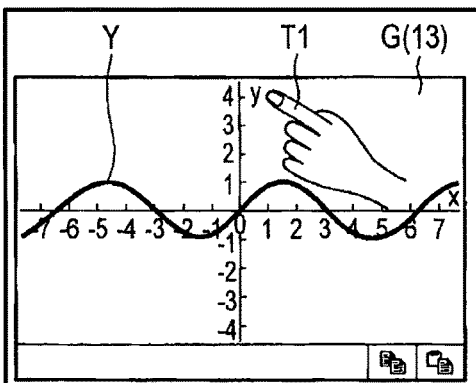
(B1)
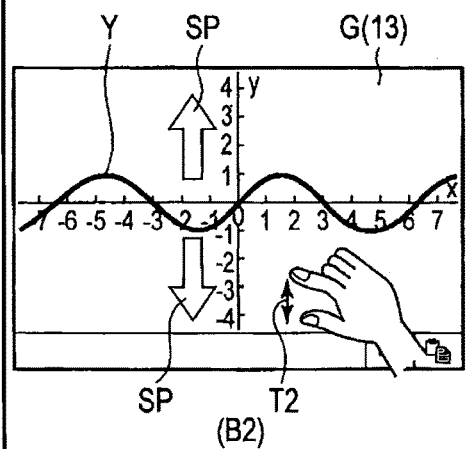
(B2)
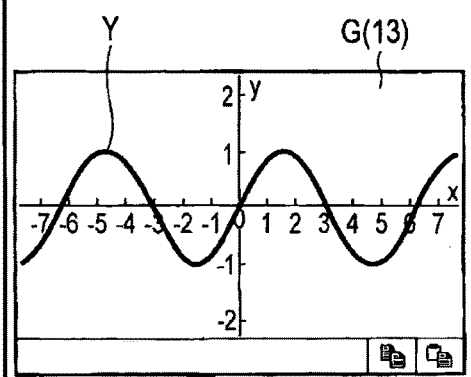
(B3)

(CONT.)

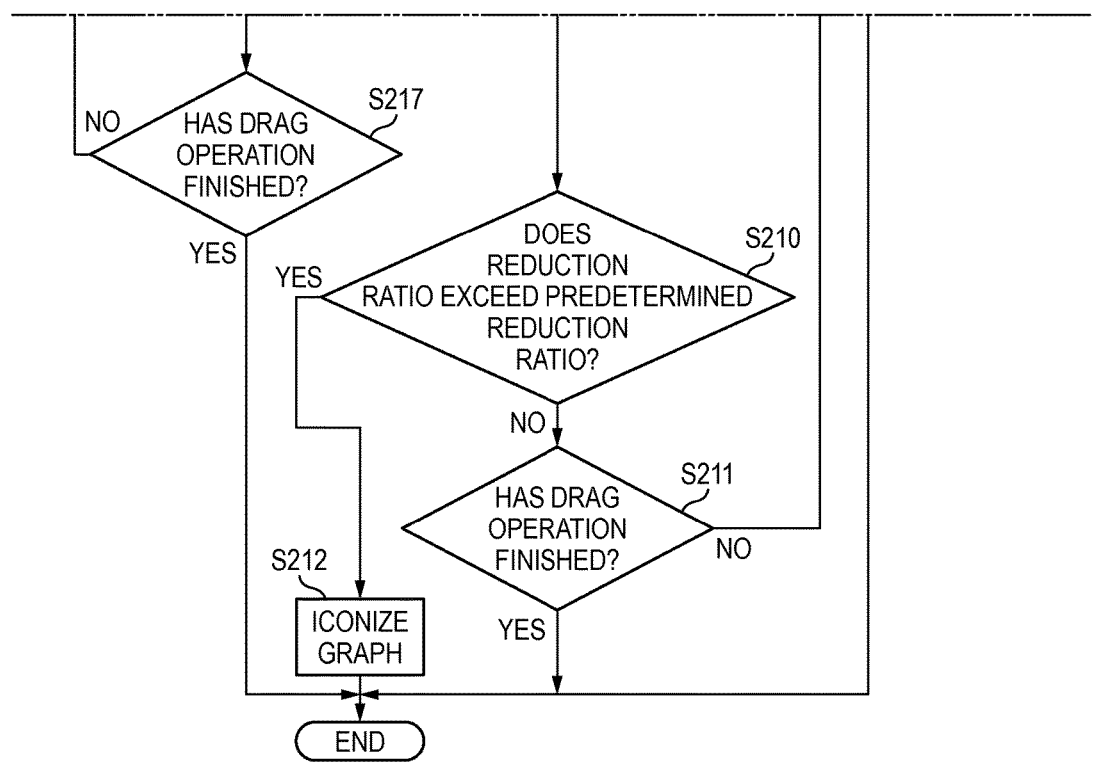

GRAPH DISPLAY APPARATUS, GRAPH DISPLAY METHOD AND STORAGE MEDIUM

CROSS-REFERENCE TO RELATED APPLICATION

This application claims priority based on Japanese Patent Application No. 2014-171879, filed on Aug. 26, 2014, the entire contents of which are incorporated by reference herein.

BACKGROUND OF THE INVENTION

Field of the Invention

The present invention relates to a graph display apparatus and a graph display method and a storage medium for displaying graphs corresponding to function expressions.

Description of the Related Art

Recently, there are information devices such as portable terminals and portable phones and interfaces on display areas having touch panels are common. Therefore, it is possible to freely move contents of a display area according to a position and a movement of a user' touch on a corresponding touch panel.

Also, small-sized electronic computers (calculators) having a function of calculating function expressions are improved so as to be able to display graphs and figures, and, touch panels are provided in their display areas.

Technologies for enlarging or reducing or scrolling contents of a display area in such a display with a touch panel are considered as follow.

There is a technology for enlarging or reducing a graph in a calculator for displaying graphs corresponding to function expressions on a coordinate system having a predetermined coordinate range (for example, JP-A-S62-186347). According to this technology, coordinate data on a range designated on a display area by user are stored, and if an enlargement key or a reduction key is pressed, a new coordinate range is generated based on the stored coordinate data, and a graph is enlarged or reduced to be displayed.

Also, there is a figure display control device having a function of scrolling graphs and coordinate axes (for example, JP-A-2004-126759). According to this technology, in a case where a graph, coordinate axes, and a trace pointer are displayed on a display area such that the trace pointer is on the graph, if a touch operation for moving the trace pointer toward the outside of the display area is performed on an end of a coordinate axis, the graph and the corresponding coordinate axis are scrolled such that the trace pointer is displayed inside the display area.

With respect to display control devices with touch panels according to the related art, some technologies for enlarging or reducing or scrolling contents of a display area in response to touch operations are considered; however, it is desirable to implement a more convenient display control technology.

The present invention was made in view of this problem, and an object of the present invention is to provide a more convenient graph display apparatus capable of controlling the state of display of a graph in response to a user's operation such that it becomes easier to see the graph.

SUMMARY OF THE INVENTION

A graph display apparatus of the present invention includes a display unit and a processor. The display unit includes a touch panel. The processor performs the following processes: controlling the display unit to display a graph on a graph display area in a predetermined coordinate range, the graph corresponding to an expression; acquiring a position designated by a touch of a user on the graph display area, and when a drag operation is detected after the touch of the user ends, changing the coordinate range with the designated position fixed in response to the drag operation, thereby reducing or enlarging the graph, and controlling the display unit to display the reduced or enlarged graph.

According to the present invention, it is possible to provide a more convenient graph display apparatus capable of controlling the state of display of a graph in response to a user's operation such that it becomes easier to see the graph.

BRIEF DESCRIPTION OF THE DRAWINGS

FIGS. 7A and 7B are views illustrating other graph display operations based on user's operations according to the graph display process of the first embodiment of the graphing calculator 10.

DETAILED DESCRIPTION OF THE INVENTION

Hereinafter, embodiments of the present invention will be described with reference to the accompanying drawings.

Although a graph display apparatus of the present invention is configured as a dedicated graphing calculator 10 to be described below, it may be configured as a tablet terminal, a portable phone, a portable game console, or the like having a function of displaying graphs according to function expressions.

Figure 1:
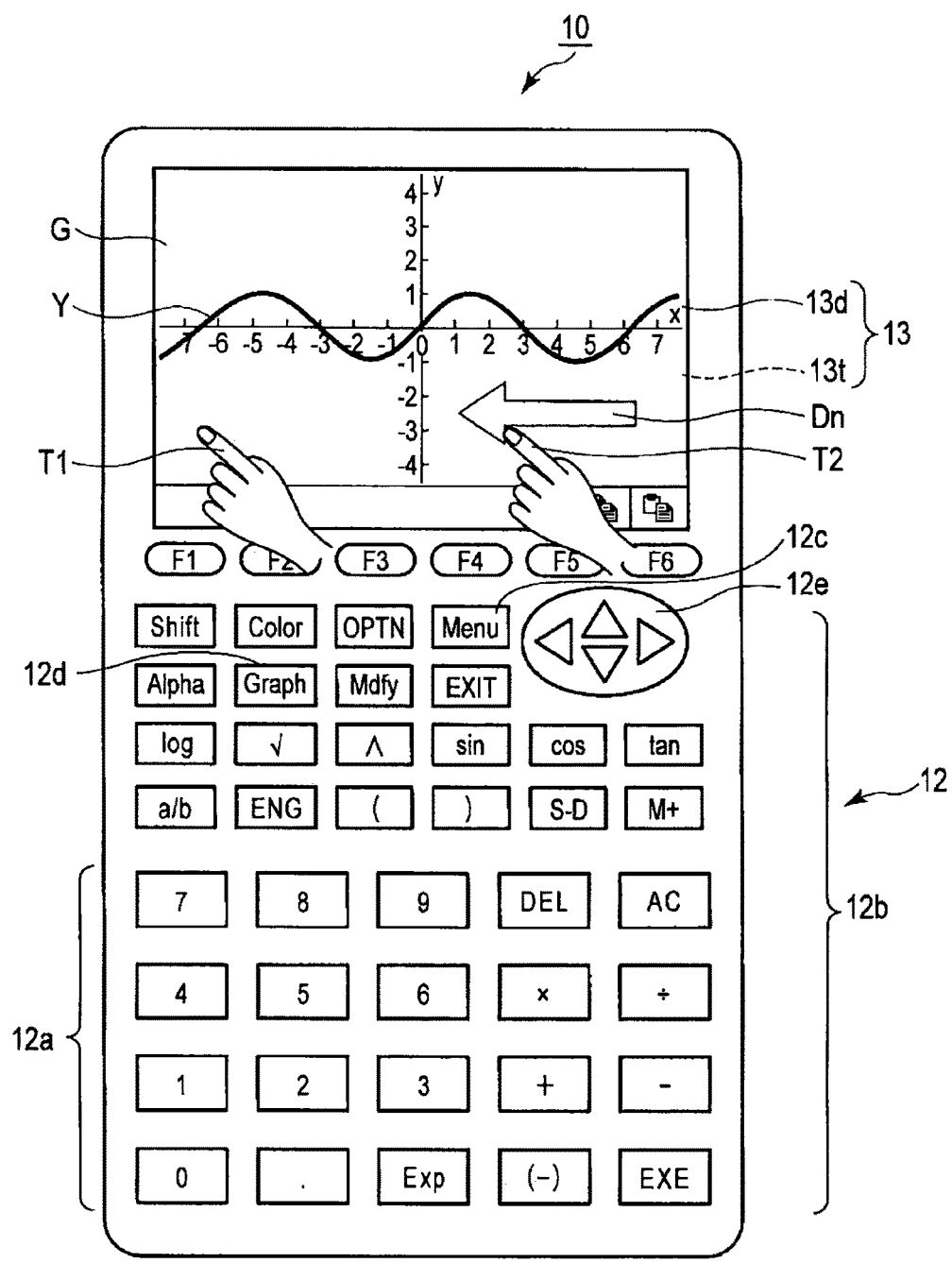
FIG. 1 is a front view illustrating a configuration of the external appearance of a graphing calculator 10 according to an embodiment of a graph display apparatus of the present invention.

FIG. 1 is a front view illustrating a configuration of the external appearance of a graphing calculator 10 according to an embodiment of a graph display apparatus of the present invention.

The graphing calculator 10 has a function of displaying an input function expression "y=f(x)" and a graph Y according to the input function expression.

In the main body of the graphing calculator 10, in a one-third range from the lower end of the front surface of the main body, a key input unit 12 is provided, and in a two-third range from the upper end of the front surface, a touch panel display unit 13 is provided.

The key input unit 12 includes a numerical-value/symbol key set 12a, a function/operator key set 12b, a "Menu" key 12c, a "Graph" key 12d, a cursor key 12e, function keys F1 to F6, and so on.

The numerical-value/symbol key set 12a is composed of an array of individual keys for inputting numerical values and symbols.

The function/operator key set 12b is composed of various function symbol keys and operator keys of operators such as "+", "−", "×", "÷", and "=", which can be operated to input arithmetic expressions or function expressions.

The "Menu" key 12c can be operated to display a menu to select and set various operation modes, which include an arithmetic operation mode for performing arithmetic processing with an arbitrary input calculation formula such as a four-fundamental-arithmetic-operation formula or a function formula, a graph mode for performing a process of drawing graphs according to input function expressions, a program mode for performing calculating processes according to arbitrary input programs, and so on.

The "Graph" key 12d can be operated to draw an arbitrary graph based on input data.

The cursor key ("↑", "↓", "←", and "→") 12e can be operated, for example, to select and send each displayed data item or to move a cursor.

The function keys F1 to F6 can be operated to select various selection menus, which are displayed along the lower edge of the screen of the display unit 13 according to each operation mode.

Also, the touch panel display unit 13 is configured by putting a transparent touch panel 13t on a liquid crystal display screen 13d capable of color display.

Further, the graphing calculator 10 has a function of enlarging or reducing a graph display area G (the touch panel display unit 13) where the graph Y according to the function expression "y=f(x)" is being displayed in the graph mode, in various forms according to how to perform a touch operation (T1 or T2) on the corresponding graph display area G, and displaying the enlarged or reduced graph display area G.

Figure 2:
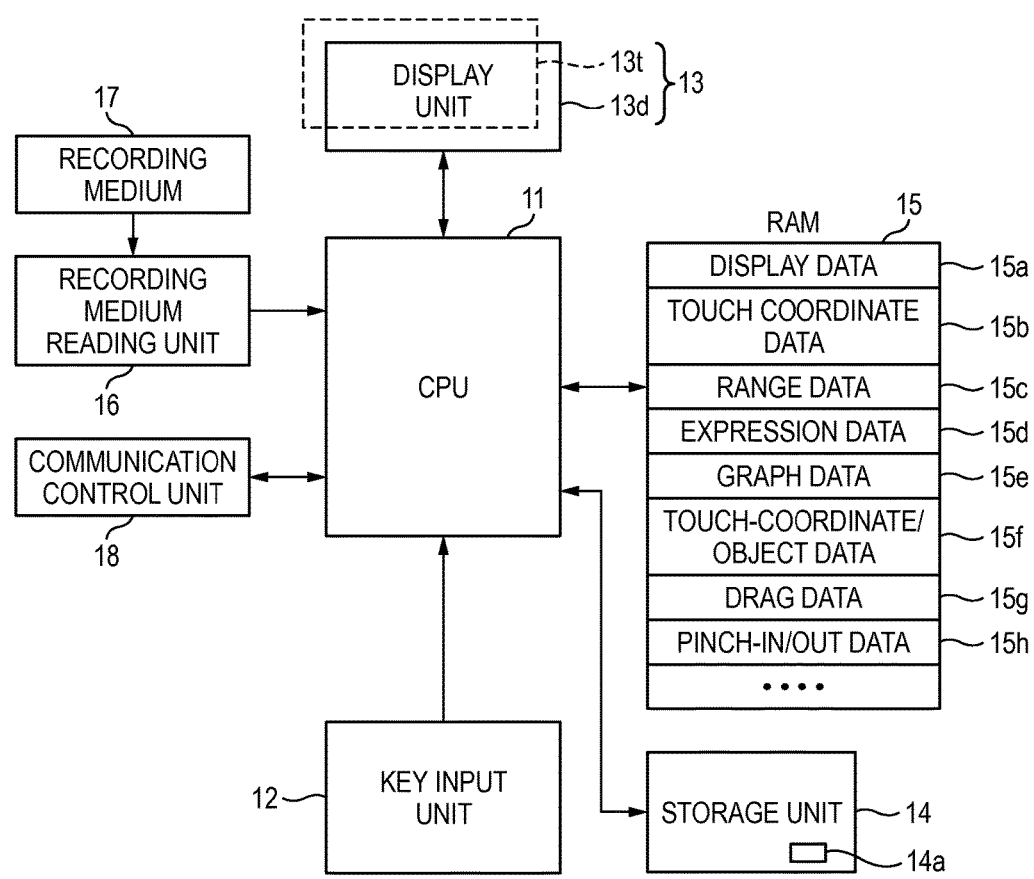
FIG. 2 is a block diagram illustrating a configuration of an electronic circuit of the graphing calculator 10.

FIG. 2 is a block diagram illustrating a configuration of an electronic circuit of the graphing calculator 10.

The electronic circuit of the graphing calculator 10 includes a CPU 11 which is a micro computer.

The CPU 11 uses a RAM 15, as a memory for work, to control operations of individual circuit units according to a calculator control program 14a stored in advance in a storage device 14 such as a flash ROM, thereby performing various functions of the graphing calculator 10, such as a calculator function and a graph display function.

Also, the calculator control program 14a may be loaded from an external recording medium 17 such as a memory card into the storage unit 14 through a recording medium reading unit 16, or may be downloaded from a Web server (a program server) on a communication network (the Internet) into the storage device 14 through a communication control unit 18.

The CPU 11 is connected to not only the key input unit 12 and the touch panel display unit 13 shown in FIG. 1, but also the storage device 14, the RAM 15, the recording medium reading unit 16, the communication control unit 18, and so on.

The RAM 15 stores a variety of data necessary for processing operations of the CPU 11. This RAM 15 has a display data storage area 15a, a touch coordinate data storage area 15b, a range data storage area 15c, an expression data storage area 15d, a graph data storage area 15e, a touch-coordinate/object data storage area 15f, a drag data storage area 15g, and a pinch-in/out data storage area 15f.

In the display data storage area 15a, data which can be displayed in color on the screen of the touch panel display unit 13 are stored.

In the touch coordinate data storage area 15b, coordinate data of touch positions according to user's operations detected by the touch panel display unit 13 are stored.

In the range data storage area 15c, an X coordinate range (from Xmin to Xmax) and a Y coordinate range (from Ymin to Ymax) which are set with respect to a graph display area G in the graph mode are stored.

In the expression data storage area 15d, data on a function expression "y=f(x)" which is input by operating the key input unit 12 is stored.

In the graph data storage area 15e, generation data of a graph Y to be displayed based on a function expression "y=f(x)", stored in the expression data storage area 15d, on a graph display area G having coordinate ranges stored in the range data storage area 15c is stored.

In the touch-coordinate/object data storage area 15f, data on an object or data on an end of the display area (the left end, the right end, the upper end, or the lower end) corresponding to a touch position is stored. More specifically, in a case where a user performs a touch operation in a state where a graph Y is being displayed on a graph display area G, if there is an object at the corresponding touch position, data on the object is stored; whereas if there is no object at the corresponding touch position, data on an end of the display area corresponding to the corresponding touch position is stored. In this embodiment, the object means a constituent element of a graph display area, such as an x axis, a y axis, the origin "0", or a feature point (a vertex, an intersection point, or a contact point).

In the drag data storage area 15g, drag lengths (distances) in an x axis direction and a y axis direction which are calculated according a user's drag operation on the touch panel display unit 13 are stored.

In the pinch-in/out data storage area 15f, a distance by which a distance between the positions of two touched points has narrowed due to a user's pinch-in operation on the touch panel display unit 13, or a distance by which a distance between the positions of two touched points has widened due to a user's pinch-out operation on the touch panel display unit 13 is stored.

The CPU 11 controls the operations of the individual circuit units according to commands for various processes described in the calculator control program 14a, whereby software and hardware operate in cooperation with each other, whereby the graphing calculator 10 configured as described above implements various functions to be described in the following operation description.

Figure 3:
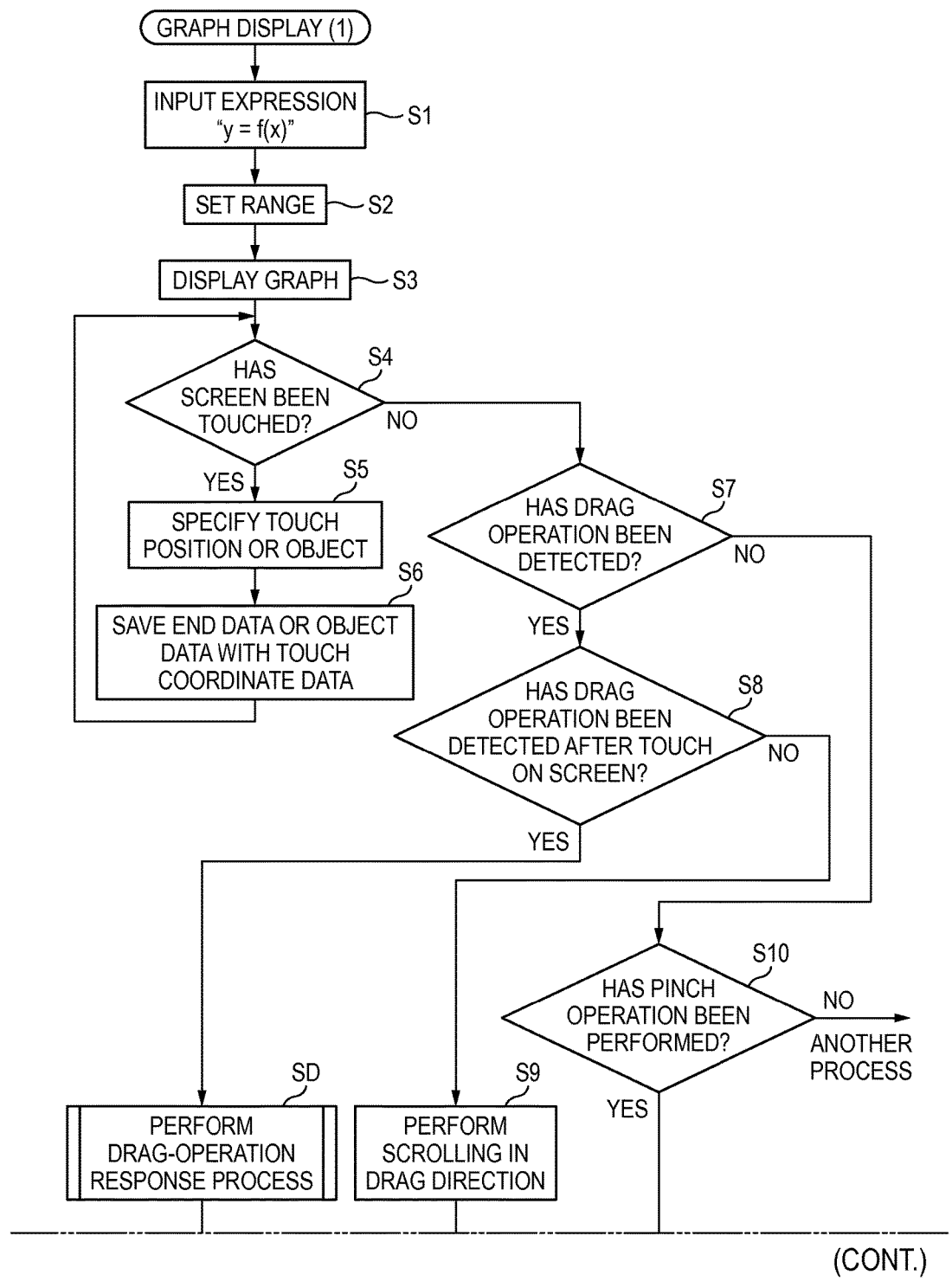
FIG. 3 is an explanatory view illustrating an outline of various reducing/enlarging functions according to user's touch operations based on a graph display process of the graphing calculator 10.

FIG. 3 shows a table illustrating what reducing or enlarging process is performed in the graph display process of the graphing calculator 10 in response to what user's touch operation. That is, FIG. 3 is an explanatory view illustrating an outline of a reducing/enlarging function related to touch operations.

For example, from descriptions of the first row and the second row, it is possible to understand the following.

After the user first touches the left end of a graph display area G and then touches the screen with one finger, if the user performs a drag operation (also referred to as a swipe) toward the right, a graph Y is enlarged in an X direction with the left of the corresponding graph display area G fixed, and then is displayed, and conversely, if the user performs a drag operation toward the left, the graph Y is reduced in the X direction with the left of the corresponding graph display area G fixed, and then is displayed (see (A1) to (A3) of FIG. 7A).

Also, similarly, it is possible to understand the followings.

Figure 8A:
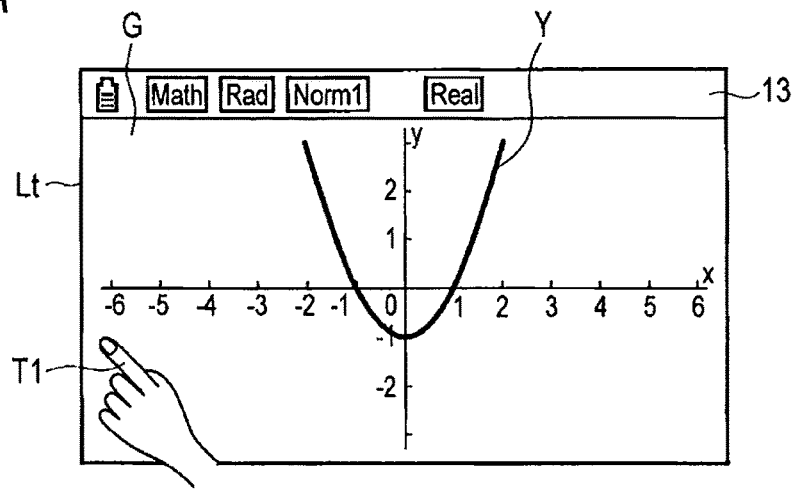
FIGS. 8A, 8B and 8C are views illustrating other graph display operations based on user's operations according to the graph display process of the first embodiment of the graphing calculator 10.
Figure 8B:
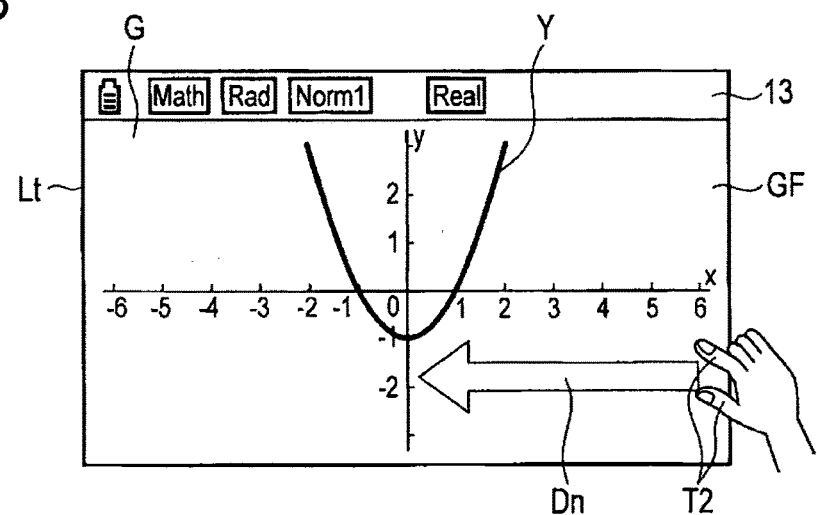
Figure 8C:
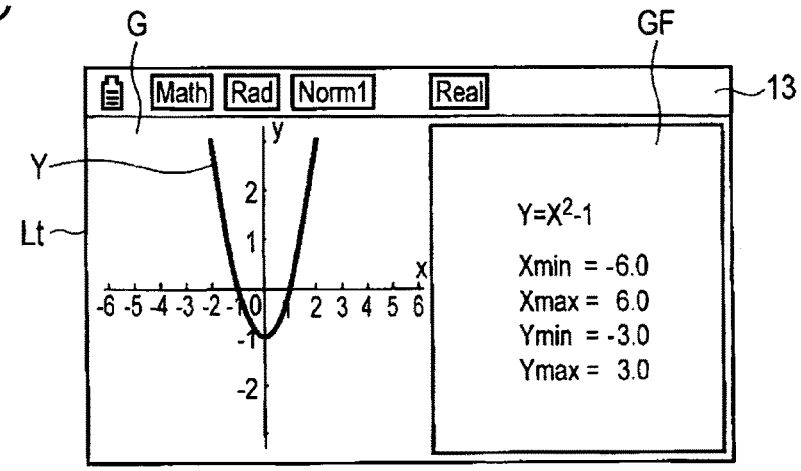

After the user first touches the left end of a graph display area G and then touches two points in a vertical direction with two fingers, if the user performs a drag operation toward the left, the graph display area G is reduced together with a graph Y in the X direction with the left of the corresponding graph display area G fixed, and then the graph Y is displayed (see FIGS. 8A, 8B and 8C).

Also, after the user first touches a y axis (an object) on a graph display area G, if the user performs a pinch-in operation, a graph Y is reduced with reference to the corresponding y axis and is displayed, and conversely, if the user performs a pinch-out operation, the graph Y is enlarged with reference to the corresponding y axis and is displayed (see (B1) to (B3) of FIG. 7B).

Also, on the graph display area G, in a case where the user performs only a pinch-in operation without touching an object, the graph Y is reduced with reference to the center of the corresponding graph display area G, and is displayed, and conversely, in a case where the user performs a pinch-out operation on the graph display area G without touching an object, the graph Y is enlarged with reference to the center of the corresponding graph display area G, and is displayed.

Although not described in the table of FIG. 3, even in a case where the user first touches the right end, the upper end, or the lower end, and then performs a drag operation, similarly, an enlarging or reducing process according to the direction of the corresponding drag operation is performed.

Also, even if the user first touches the x axis (an object), and then performs a pinch-in operation or a pinch-out operation on two points in a vertical direction, a reducing or enlarging process is performed with reference to the x axis.

Further, on the graph display area G, in a case where the user first touches the origin "0" or a feature point (an object) of the graph Y, and then performs a drag operation, according to whether the direction of the corresponding drag operation is a direction to approach the touched object or a direction to move further away from the touched object, a reducing or enlarging process is performed with the corresponding point (the object) as the center.

Now, an operation of the graphing calculator 10 having the above described configuration will be described.

First Embodiment

Figure 4:
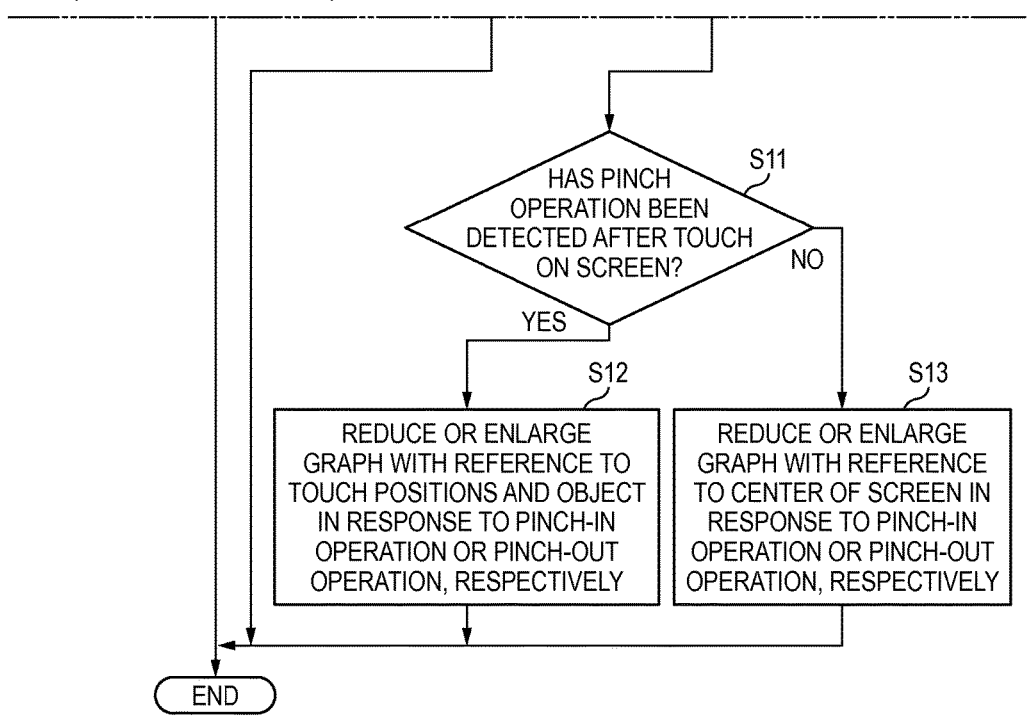
FIG. 4 is a flow chart illustrating a graph display process of a first embodiment of the graphing calculator 10.

FIG. 4 is a flow chart illustrating a graph display process of a first embodiment of the graphing calculator 10.

Figure 5:
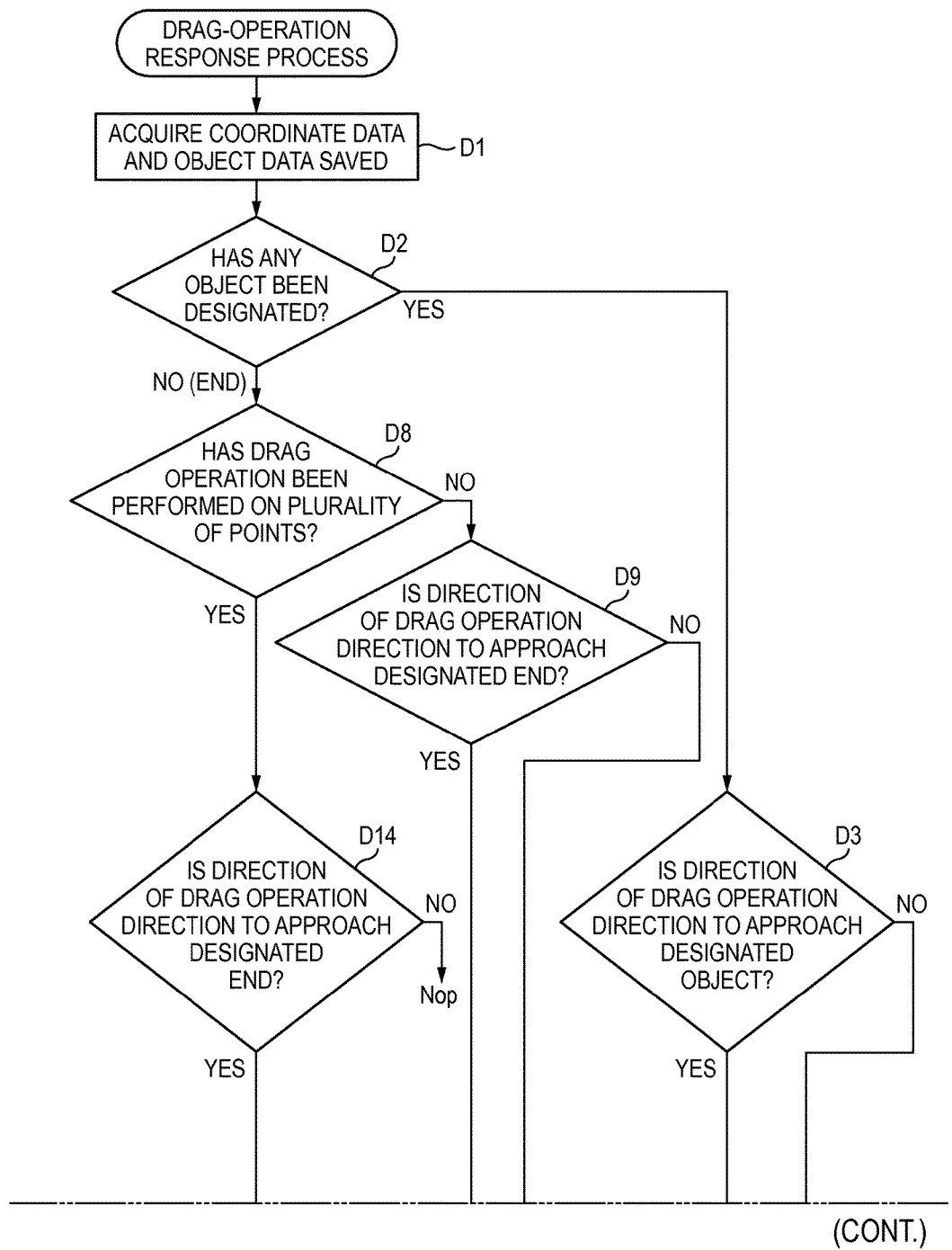
FIG. 5 is a flow chart illustrating a drag-operation response process of the graph display process of the first embodiment of the graphing calculator 10.

FIG. 5 is a flow chart illustrating a drag-operation response process of the graph display process of the first embodiment of the graphing calculator 10.

Figure 6A:
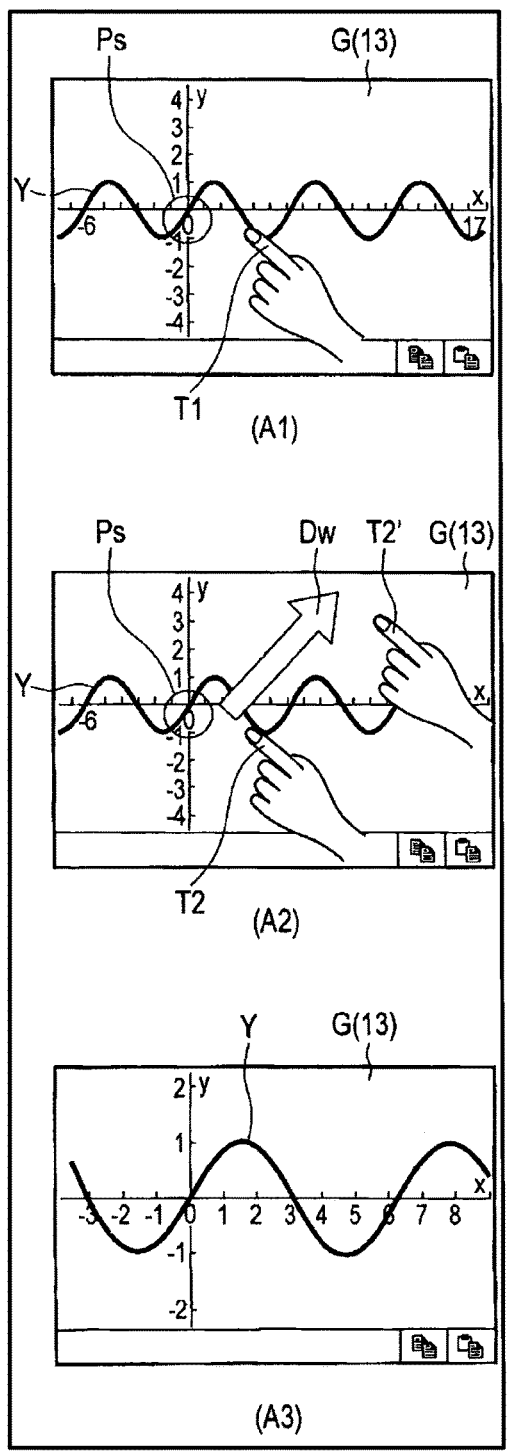
FIGS. 6A and 6B are views illustrating graph display operations based on user's operations according to the graph display process of the first embodiment of the graphing calculator 10.
Figure 6B:
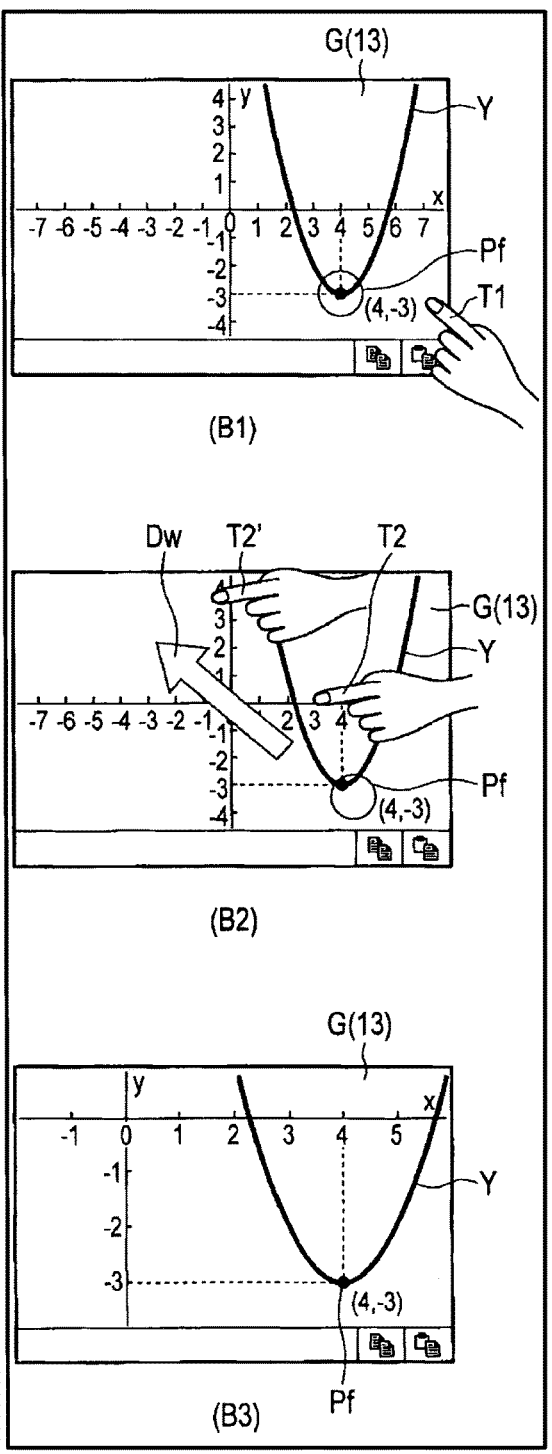

FIG. 6A and FIG. 6B are views illustrating graph display operations according to user's operations according to the graph display process of the first embodiment of the graphing calculator 10.

If the graph mode is selected from a menu screen, the graph display process shown in FIG. 4 is activated.

If the graphing calculator 10 enters the graph mode, a desired function expression "y=f(x)" is input by the user. The input function expression "y=f(x)" is stored in the expression data storage area 15d (STEP S1).

Also, if an X coordinate range (from Xmin to Xmax) and a Y coordinate range (from Ymin to Ymax) are set, as a display range where a graph display area G will be displayed, on a coordinate range setting screen (not shown), the set coordinate ranges are stored in the range data storage area 15c (STEP S2).

Thereafter, if the "Graph" key 12d is operated, a graph display area G of X and Y coordinates according to the set coordinate ranges is displayed on the touch panel display unit 13, for example, as shown in FIG. 1. Further, drawing data of a graph Y corresponding to the input function expression "y=f(x)" is generated, and is stored in the graph data storage area 15e, and the corresponding graph Y is displayed on the X and Y coordinates of the graph display area G (STEP S3).

Thereafter, if a touch operation T1 of the user on the graph display area G is detected ("Yes" in STEP S4), a touched position or a touched object is specified (STEP S5). That is, whether the vicinity of any one of the left, right, upper, and lower ends of the corresponding graph display area G has been touched or an object (such as an x axis, a y axis, the origin "0", or a feature point of the graph Y) in the corresponding graph display area G has been touched is determined based on the drawing data of the graph Y stored in the graph data storage area 15e and touch coordinate data stored in the touch coordinate data storage area 15b.

Subsequently, data representing the specified end of the graph display area G (end data) or data representing the specified object (object data) is saved in the touch-coordinate/object data storage area 15f in association with the coordinate data of the specified end or object (STEP S6). Also, in the present embodiment, a case where a position which does not correspond to the vicinity of an end of the graph display area G or an object has been touched is considered as the screen has not been touched, and in this case, any end data or object data is not saved.

For example, in a case where a graph Y corresponding a sine function expression is being displayed on a graph display area G as shown in (A1) of FIG. 6A, if a touch operation T1 is performed on the vicinity Ps of the origin of X and Y coordinates, object data on the corresponding origin "0" is saved in the touch-coordinate/object data storage area 15f in association with corresponding coordinate data (STEPS S4 to S6).

Thereafter, if a drag operation Dw according to the next touch operation T2~T2' as shown in (A2) of FIG. 6A is detected ("Yes" in STEP S7), and then it is determined that the drag operation has been detected after a touch on the screen ("Yes" in STEP S8), a transition to a drag-operation response process of FIG. 5 is performed (STEP SD).

In the drag-operation response process, first, the object data on the origin "0" and the coordinate data on the origin "0" saved in the touch-coordinate/object data storage area 15f are acquired (STEP D1), and then whether any object has been designated or not is determined (STEP D2).

Here, since the object data on the origin "0" is acquired, it is determined that an object has been designated ("Yes" in STEP D2).

In this case, whether the direction of the drag operation Dw is a direction to approach the designated object (the origin "0") is determined (STEP D3). Here, since it is determined that the direction of the drag operation Dw is a direction to move further away from the designated object (the origin "0") ("No" in STEP D3), the coordinate ranges of X and Y coordinates are reduced with the designated object (the origin "0") fixed (the interval of coordinate gradations widens) (STEP D6), whereby the graph Y is enlarged with the designated object (the origin "0") as the center and is displayed as shown in (A3) of FIG. 6A (STEP D7). In this case, movement distances in the X direction and Y direction according to the drag operation Dw are detected, and new coordinate ranges are calculated based on the movement distances.

Also, in a case where a graph Y corresponding to a quadratic function expression has been drawn in a graph display area G as shown in (B1) of FIG. 6B, after a touch operation T1 is first performed on the minimum point (an object) Pf of the corresponding graph Y (STEPS S1 to S6), if a drag operation Dw in a direction to move further away from the corresponding object Pf as shown in (B2) of FIG. 6B is detected (STEPS S7 to SD), like in the above described case, coordinate ranges of X and Y coordinates are reduced with the corresponding object Pf fixed (STEP D6 in a case of "No" in STEP D3 subsequent to STEPS D1 and D2), whereby the corresponding graph Y is enlarged with the object Pf as the center, and is displayed as shown in (B3) of FIG. 6B (STEP D7).

Meanwhile, in a case where an object (the origin "0" Ps or the vertex Pf) is designated, and then a drag operation Dn in a direction to approach the designated object is performed (STEPS S7 to SD), the coordinate ranges of X and Y coordinates are expanded with the corresponding object fixed (the interval of coordinate gradations narrows) (STEPS D1 to D4), whereby the corresponding graph Y is reduced with the corresponding object as the center, and is displayed (STEP D5).

FIG. 7A and FIG. 7B are views illustrating other display operations according to the graph display process of the first embodiment.

For example, in a case where a graph Y corresponding to a sine function expression is being displayed on a graph display area G as shown in (A1) of FIG. 7A, if a touch operation T1 is performed on the left end Lt of the corresponding graph display area G (STEP S4), the left end Lt of the display area is specified (STEP S5), and end data representing the left end Lt and coordinate data on the left end Lt are saved in the touch-coordinate/object data storage area 15$f$ (STEP S6).

Thereafter, if a drag operation Dn from the right to the left according to a touch operation T2 as shown in (A2) of FIG. 7A is detected ("Yes" in STEP S7), it is determined that the drag operation Dn has been detected after a touch on the screen ("Yes" in STEP S8), and a transition to the drag-operation response process of FIG. 5 is performed (STEP SD).

In this case, the end data (the left end Lt) and the coordinate data of the left end saved in the touch-coordinate/object data storage area 15$f$ are acquired (STEP D1), and it is determined that an end (the left end Lt) of the graph display area G, not an object, has been designated ("No" in STEP D2).

Thereafter, whether the drag operation Dn has been performed by a plurality of fingers is determined (STEP D8). If it is determined that the drag operation Dn is movement of one point ("No" in STEP D8), whether the direction of the drag operation Dn is a direction to approach the designated end (the left end Lt) or not is determined (STEP D9). If it is determined that the direction of the drag operation Dn is a direction to approach the designated end (the left end Lt) ("Yes" in STEP D9), the coordinate range of X coordinates is expanded with the corresponding end (the left end Lt) fixed (the interval of coordinate gradations narrows) (STEP D10), whereby the graph Y is reduced with the corresponding end (the left end Lt), and is displayed as shown in (A3) of FIG. 7A (STEP D11). Also, even if the drag operation Dn has been performed in an oblique direction, with reference to only a movement amount in the X direction, a new coordinate range is calculated.

Meanwhile, in a case where a drag operation Dw in a direction to move further away from the designated end (the left end Lt) has been detected ("No" in STEP D9 of STEP SD after STEPS S7 and S8), the coordinate range of X coordinates is reduced with the corresponding end (the left end Lt) fixed (the interval of coordinate gradations widens) (STEP D12), whereby the graph Y is enlarged with the corresponding end (the left end Lt) fixed, and is displayed (STEP D13).

In the above descriptions of STEPS D9 to D13, a case where the designated end is the left end Lt has been described. However, even in a case where any one end of the right end, the upper end, and the lower end has been designated, if a drag operation Dn in a direction to approach the corresponding end is detected, the graph Y is reduced with the corresponding end fixed, and is displayed (STEPS D9 to D11); whereas if a drag operation Dw in a direction to move further away from the designated end is detected, the graph Y is enlarged with the corresponding end fixed, and is displayed (STEPS D12 and D13).

Meanwhile, in a case where a graph Y corresponding a sine function expression is being displayed on a graph display area G as shown in (B1) of FIG. 7B, if the y axis (an object) is subjected to a touch operation T1, thereby being designated (STEP S4), the y axis is specified (STEP S5), and object data representing the y axis and coordinate data on the y axis are saved in the touch-coordinate/object data storage area 15$f$ (STEP S6).

Thereafter, if a pinch-out operation SP according to a touch operation T2 on two points of the graph display area G as shown in (B2) of FIG. 7B is detected ("Yes" in STEP S10), it is determined that the pinch-out operation SP has been performed after a touch on the screen is determined (STEP S11).

If it is determined that the pinch-out operation has been performed after a touch on the screen ("Yes" in STEP S11), the graph Y is enlarged in the y axis direction based on the designated object (the y axis), and is displayed (STEP S12).

Meanwhile, in a case where a pinch-in operation has been detected after a touch on the y axis of the graph display area G (STEPS S1 to S6), the graph Y is reduced in the y axis direction based on the designated object (the y axis), and is displayed (STEPS S10 to S12).

In the above descriptions of STEPS S10 to S12, a case where the designated object is the y axis has been described. However, even in a case where the x axis has been designated, if a pinch-out operation SP is performed, the graph Y is enlarged in the x axis direction, and is displayed; whereas if a pinch-in operation is performed, the graph Y is reduced in the x axis direction, and is displayed.

Meanwhile, in a case where a pinch operation is detected ("No" STEP S11 after STEP S10) before an end of the graph display area G or an object is designated by a touch operation T1, if the corresponding pinch operation is a pinch-in operation using the center of the graph display area G as a reference, the graph Y is reduced, and is displayed; whereas if the corresponding pinch operation is a pinch-out operation, the graph Y is enlarged, and is displayed (STEP S13). That is, a reducing process or an enlarging process is performed with the center of the graph display area G fixed.

FIGS. 8A, 8B and 8C are views illustrating other graph display operations in the graph display process of the first embodiment.

For example, in a case where a graph Y corresponding to a quadratic function is being displayed as shown in FIG. 8A, if a touch operation T1 is performed on the left end Lt of the graph display area G (STEP S4), the left end Lt of the display area is specified (STEP S5), and end data representing the left end Lt and coordinate data on the left end Lt are saved in the touch-coordinate/object data storage area 15*f* (STEP S6).

Thereafter, if the user performs a drag operation with two fingers as shown in FIG. 8B, a transition to the drag-operation response process of FIG. 5 is performed (STEP SD after STEPS S7 and S8).

In this case, the end data (the left end Lt) saved in the touch-coordinate/object data storage area 15*f* is acquired (STEP D1), and it is determined that an end of the graph display area G has been designated ("No" in STEP D2).

Also, based on touch coordinate data corresponding to a touch operation T2 on two points, it is determined that the detected drag operation is a touch operation on a plurality of points ("Yes" in STEP D8).

Subsequently, whether the drag operation Dn according to the touch operation T2 on two points is an operation in a direction to approach the designated end (the left end Lt) is determined (STEP D14).

If it is determined that the drag operation Dn according to the touch operation T2 on two points is an operation in a direction to approach the designated end (the left end Lt) ("Yes" in STEP D14), a graph display setting area GF including the quadratic function "Y=X2−1" of the graph Y and the coordinate ranges (Xmin, Xmax, Ymin, and Ymax) of the corresponding graph display area G written thereon is generated as a lower-level display area (STEP D15).

Thereafter, in response to the drag operation Dn in the direction to approach the designated end, and the corresponding graph display area G is reduced with the designated end (the left end Lt) is fixed while the coordinate ranges of the corresponding graph display area is maintained, whereby the reduced graph display area acts as an upper-level display area (STEP D16).

Therefore, the upper-level reduced graph display area G is displayed due to the drag operation Dn as shown in FIG. 8C such that the graph display setting area GF generated as the lower-level display area appears (STEP D17).

Also, in a case where it is determined ("No" in STEP S8) that the drag operation has been detected ("Yes" in STEP S7) before a touch on the display area, the graph display area G is scrolled in the direction of the corresponding drag operation (STEP S9).

Therefore, according to the graph display process of the first embodiment of the graphing calculator 10 having the above described configuration, by only performing a touch operation on a position to be a reference of the graph display area G and then performing a drag operation in a direction to approach or move further away from the reference position, it is possible to freely perform reduction or enlargement display of a graph Y obtained by changing coordinate ranges, with the corresponding reference position fixed, in response to the dragging operation.

Also, by performing a drag operation on two points, it is possible to display a graph display area G obtained by reducing a graph display area G with an arbitrary end side fixed, and a graph display setting area GF including the function expression of a graph Y existing on the corresponding graph display area G and the coordinate ranges of the corresponding graph display area, side by side.

Second Embodiment

Figure 9:
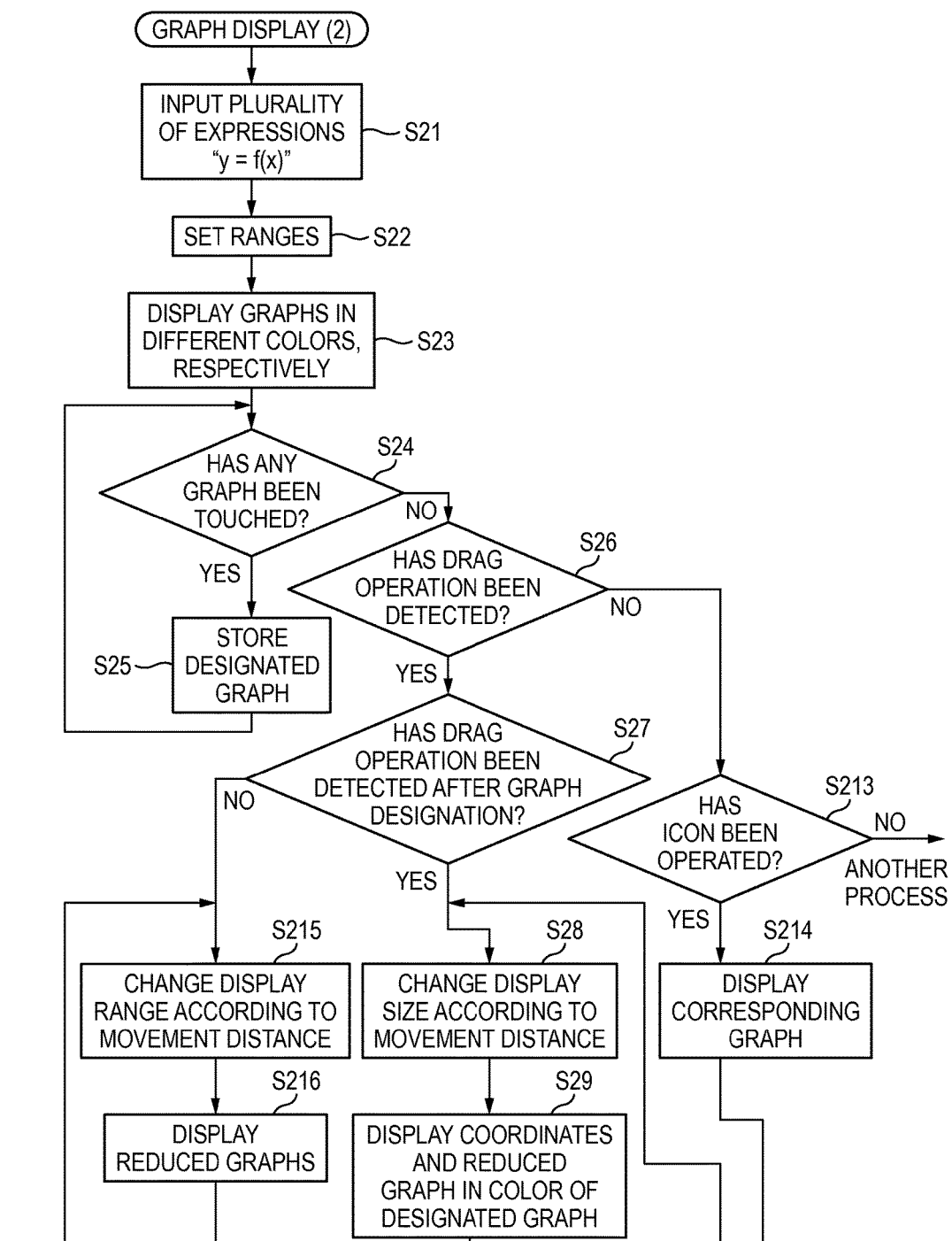
FIG. 9 is a flow chart illustrating a graph display process of a second embodiment of the graphing calculator 10.

FIG. 9 is a flow chart illustrating a graph display process of a second embodiment of the graphing calculator 10.

Figure 10A:
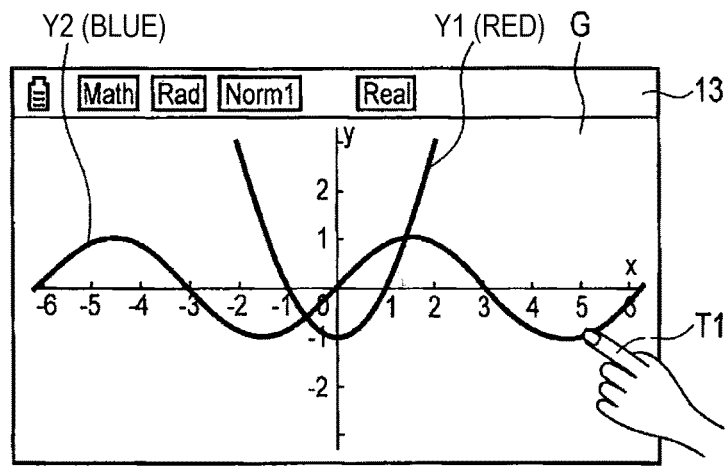
FIGS. 10A, 10B and 10C are views illustrating graph display operations based on user's operations according to the graph display process of the second embodiment of the graphing calculator 10.
Figure 10B:
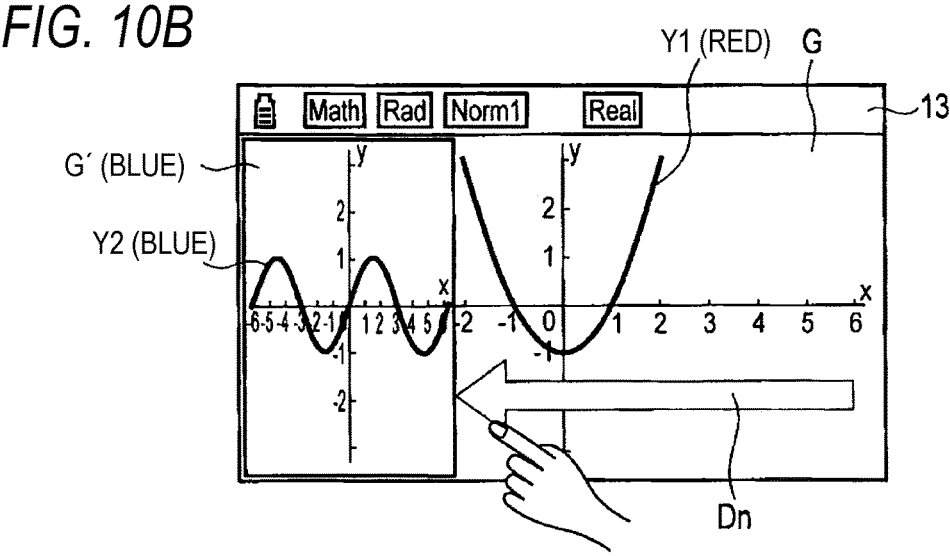
Figure 10C:
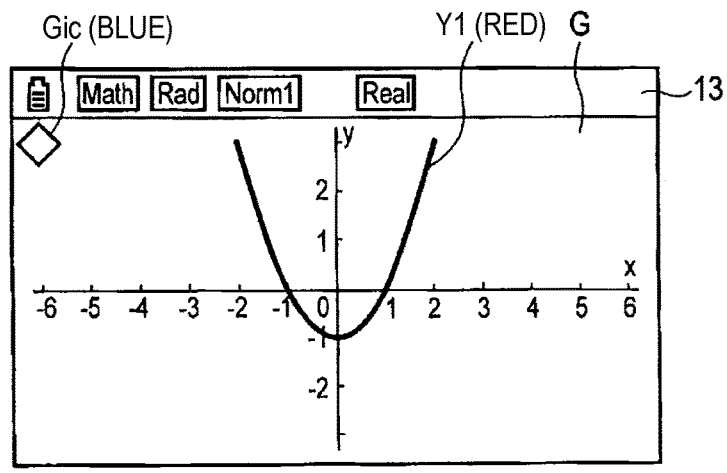

FIGS. 10A, 10B and 10C are views illustrating graph display operations in the graph display process of the second embodiment.

In the graph mode, if the user inputs a plurality of function expressions (here, two function expressions) "y1=f1(x)" and "y2=f2(x)", the input function expressions "y1=f1(x)" and "y2=f2(x)" are stored in the expression data storage area 15*d* (STEP S21).

Also, if an X coordinate range (from Xmin to Xmax) and a Y coordinate range (from Ymin to Ymax) are set as a display range where a graph display area G will be displayed, the set coordinate ranges are stored in the range data storage area 15*c* (STEP S22).

Thereafter, if the "Graph" key 12*d* is operated, a graph display area G of X and Y coordinates according to the set coordinate ranges is displayed on the touch panel display unit 13, as shown in FIG. 10A. Further, drawing data items of graphs Y1 and Y2 corresponding to the input function expressions "y1=f1(x)" and "y2=f2(x)" are generated, and are stored in the graph data storage area 15*e*, and on the X and Y coordinates of the graph display area G, the corresponding graph Y1 is displayed in red, and the graph Y2 is displayed in a different color which is blue (STEP S23).

If any one graph (here, the graph Y2 (blue)) of the two displayed graphs is designated by a touch operation T1 ("Yes" in STEP S24), the corresponding graph Y2 is stored as a designated graph (STEP S25).

Thereafter, if the right end of the graph display area G is subjected to a touch operation T2 and is subjected to a drag operation Dn in a left direction as shown in FIG. 10B ("Yes" in STEP S26), it is determined that the drag operation has been detected after graph designation (STEP S27).

Here, if it is determined that the drag operation has been detected after designation of the graph Y2 (blue) ("Yes" in STEP S27), a reduced graph display area G' is generated by reducing the display size of the graph display area G in the X direction according to the movement distance of the drag operation Dn (STEP S28). On this reduced graph display area G' (blue), coordinates and a reduced graph Y2 are displayed in the same color as that of the designated graph Y2 (blue) (STEP S29).

At this time, on the original graph display area G, the undesignated graph Y1 (red) is displayed as it is without a change.

Also, with respect to the reduced graph display area G' (blue) which is gradually reduced and displayed according to the drag operation Dn (STEPS S28 and S29 in a case of "No" in STEP S211), whether the reduction ratio exceeds a predetermined reduction ratio is determined (STEP S210). That is, it is determined whether the reduction ration is smaller than a predetermined reduction ratio during the reducing time of the reduced graph display area G'.

If it is determined with respect to the reduced graph display area G' (blue) that the reduction ratio exceeds the predetermined reduction ratio, that is, if it is determined that the reduction ratio of the reduced graph display area G' (blue) is smaller than the predetermined reduction ratio ("Yes" in STEP S21), the corresponding reduced graph display area G' (blue) is deleted, and a graph icon Gic (blue) which is corresponds to the reduced graph display area G' is generated (which is, the reduced graph display area G is iconized) and is displayed as shown in FIG. 10C (STEP S212).

Thereafter, in a case where the graph icon Gic (blue) is touched ("Yes" in STEP S213), the reduced graph display area G' (blue) of the graph Y2 (blue) having been iconized as the graph icon Gic (blue) is displayed again, for example, as shown in FIG. 10B (STEP S214). If a drag operation which is the reverse of the drag operation Dn in the left direction is performed, the reduced graph display area G' (blue) returns to the original display size.

Meanwhile, in a case where the drag operation Dn has been performed on the graph display area including the plurality of graphs Y1 (red) and Y2 (blue) displayed thereon, without designating any graph, as shown in FIG. 10A (STEP S26 and "No" in STEP S27), the coordinate range of the graph display area G is changed according to the movement distance of the drag operation Dn (STEP S215), whereby the graphs Y1 and Y2 are reduced and displayed together (STEP S216, "No" in STEP S217, and then STEPS S216 and S217).

Therefore, it is possible to generate a reduced graph display area G' of only a graph designated from a plurality of graphs displayed on a graph display area G and reduce and display the reduced graph display area G' on the graph display area G where there are the other undesignated graphs.

Also, since a reduced graph display area G' of a designated graph Yn is reduced at a reduction ratio exceeding the predetermined reduction ratio, thereby being iconized as a graph icon Gic which is displayed, it is possible to appropriately display only the graph display area G where there are the other undesignated graphs.

Also, the method of each operation according to the graphing calculator 10 described in each embodiment, that is, the method of each of the graph display process of the first embodiment shown in the flow chart of FIG. 4, the drag-operation response process according the graph display process of the first embodiment and shown in FIG. 5, the graph display process of the second embodiment shown in FIG. 9, and the like can be recorded, as a program executable in a computer, in a storage medium (the recording medium 17) such as a memory card (such as a ROM card or a RAM card), a magnetic disk (such as a flexible disk or a hard disk), an optical disk (such as a CD-ROM or a DVD), or a semiconductor memory to be distributed. Further, a computer (the CPU 11) of an electronic device (10) having a graph display function can perform the same processes according to the above described methods by reading the program recorded on the storage medium.

Also, program data for implementing the above described individual methods can be transmitted as a program code through a communication network. Thereafter, a computer (the CPU 11) of an electronic device (10) having a graph display function can receive the program data by a communication unit (the communication control unit 18) connected to the communication network, thereby capable of performing the same processes according to the above described methods.

Also, according to the above described embodiments of the graph display apparatus, all operations of a graph display process are performed in a dedicated device which is the graphing calculator 10. However, the corresponding graph display apparatus may be configured as a server of a cloud system.

In this case, if a user inputs an arbitrary function expression "y=f(x)" from a terminal device such as tablet terminal having a user interface to the server, the server generates a graph display area G of a graph Y according to the corresponding function expression, and outputs display data of the graph display area to the terminal device such that the graph display area is displayed on the terminal device. Thereafter, if position information or object information according to a touch operation T1 or T2 on the graph display area G, and touch position movement information according to a drag operation D or a pinch operation is input from the terminal device, similarly in the embodiments, the server generates a graph display area G (G') by enlarging or reducing a graph Y according to the movement direction and distance of at least one touch position subjected to the drag operation D or the pinch operation, and outputs the graph display area to the terminal device such that the graph display area is displayed on the terminal device.

According to this, even in a case where a terminal device has no special function, it is possible to use the terminal device to access the server such that the terminal device displays a graph Y corresponding to a function expression input by a user, and it is possible to perform a touch operation T1 or T2 on the graph display area G and perform a drag operation D or a pinch operation, thereby implementing an enlarging/reducing process such that it becomes easier to see the graph display area G.

The present invention is not limited to the above embodiments, and can be implemented by modifying the constituent elements in various forms in the implementation phase, without departing from the spirit or character thereof. Also, various inventions can be made by appropriately combining a plurality of structural requirements disclosed in the embodiments. For example, some constituent elements may be removed from all constituent elements shown in the embodiments. Further, constituent elements of different embodiments may be appropriately combined.

What is claimed is:

1. A graph display apparatus comprising:
   a display unit that includes a touch panel; and
   a processor that performs the following processes:
   controlling the display unit to display a graph on a graph display area in a coordinate range, the graph corresponding to an expression;
   acquiring a position designated by a touch of a user on the graph display area;
   when a drag operation is detected after the touch of the user ends, changing the coordinate range with the designated position fixed in response to the drag operation, thereby reducing or enlarging the graph, and controlling the display unit to display the reduced or enlarged graph;
   determining a method of the drag operation of the user; and
   when the method of the drag operation is determined by the operation determination to be a touching operation on the graph display area with a plurality of fingers, performing one or more processes among (i) a first process to change the coordinate range, thereby reducing the graph, and controlling the display unit to display the reduced graph, and (ii) a second process to reduce a size of the graph display area without changing the coordinate range, and controlling the display unit to display the reduced graph display area;
   when the method of the drag operation is determined by the operation determination to be a touching operation on the graph display area with one finger, performing the other process of the first process and the second process;

controlling the display unit to display a plurality of graphs on graph display areas in coordinate ranges, the plurality of graphs corresponding to a plurality of expressions respectively;

when a drag operation is detected after the user designates one graph on one graph display area, reducing a size of the one graph display area of the designated graph in response to the drag operation, and controlling the display unit to display the reduced graph display area of the designated graph with another graph display area of another graph; and when a reduction ratio of the reduced graph display area of the designated graph is smaller than a reduction ratio in a reducing time of the designated graph, generating an icon corresponding to the reduced graph display area and controlling the display unit to display the generated icon with another graph display area of another graph.

2. The graph display apparatus according to claim 1, wherein:

the processor further performs the following processes:
determining whether an object is designated on the graph display area by the user; and
when an object is determined to be designated, changing the coordinate range based on the designated object, thereby reducing or enlarging the graph in response to the drag operation, and controlling the display unit to display the reduced or enlarged graph.

3. The graph display apparatus according to claim 1, wherein:

the processor further performs the following process:
when a pinch-in operation or a pinch-out operation is detected after a position on the graph display area is designated by the user, changing the coordinate range with reference to the designated position, thereby reducing or enlarging the graph in response to the pinch-in operation or the pinch-out operation, and controlling the display unit to display the reduced or enlarged graph.

4. The graph display apparatus according to claim 1, wherein:

the processor, in the second process, further performs the following processes:
generating a graph display setting area including the expression corresponding to the graph and the coordinate range of the graph display area before reducing the size of the graph display area; and
controlling the display unit to display the reduced graph display area and the graph display setting area.

5. A graph display method of a graph display apparatus including a display unit having a touch panel, comprising the following steps:

controlling the display unit to display a graph on a graph display area in a coordinate range, the graph corresponding to an expression;

acquiring a position designated by a touch of a user on the graph display area;

when a drag operation is detected after the touch of the user ends, changing the coordinate range with the designated position fixed in response to the drag operation, thereby reducing or enlarging the graph, and controlling the display unit to display the reduced or enlarged graph;

determining a method of the drag operation of the user; and when the method of the drag operation is determined by the operation determination to be a touching operation on the graph display area with a plurality of fingers, performing one or more processes among (i) a first process to change the coordinate range, thereby reducing the graph, and controlling the display unit to display the reduced graph, and (ii) a second process to reduce a size of the graph display area without changing the coordinate range, and controlling the display unit to display the reduced graph display area;

when the method of the drag operation is determined by the operation determination to be a touching operation on the graph display area with one finger, performing the other process of the first process and the second process;

controlling the display unit to display a plurality of graphs on graph display areas in coordinate ranges, the plurality of graphs corresponding to a plurality of expressions respectively;

when a drag operation is detected after the user designates one graph on one graph display area, reducing a size of the one graph display area of the designated graph in response to the drag operation, and controlling the display unit to display the reduced graph display area of the designated graph with another graph display area of another graph; and when a reduction ratio of the reduced graph display area of the designated graph is smaller than a reduction ratio in a reducing time of the designated graph, generating an icon corresponding to the reduced graph display area and controlling the display unit to display the generated icon with another graph display area of another graph.

6. The graph display method according to claim 5, further comprising the following steps:

determining whether an object is designated on the graph display area by the user; and
when an object is determined to be designated, changing the coordinate range based on the designated object, thereby reducing or enlarging the graph in response to the drag operation, and controlling the display unit to display the reduced or enlarged graph.

7. The graph display method according to claim 5, further comprising the following step:

when a pinch-in operation or a pinch-out operation is detected after a position on the graph display area is designated by the user, changing the coordinate range with reference to the designated position, thereby reducing or enlarging the graph in response to the pinch-in operation or the pinch-out operation, and controlling the display unit to display the reduced or enlarged graph.

8. A non-transitory storage medium recording a program which causes a computer of a graph display apparatus including a display unit having a touch panel to perform the following processes:

controlling the display unit to display a graph on a graph display area in a coordinate range, the graph corresponding to an expression;

acquiring a position designated by a touch of a user on the graph display area; and when a drag operation is detected after the touch of the user ends, changing the coordinate range with the designated position fixed in response to the drag operation, thereby reducing or enlarging the graph, and controlling the display unit to display the reduced or enlarged graph;

determining a method of the drag operation of the user; and when the method of the drag operation is determined by the operation determination to be a touching operation on the graph display area with a plurality of fingers, performing one or more processes among (i) a first process to change the coordinate range, thereby reducing the graph, and controlling the display unit to display the reduced graph, and (ii) a second process to reduce a size of the graph display area without changing the coordinate range, and controlling the display unit to display the reduced graph display area;

when the method of the drag operation is determined by the operation determination to be a touching operation on the graph display area with one finger, performing the other process of the first process and the second process;

controlling the display unit to display a plurality of graphs on graph display areas in coordinate ranges, the plurality of graphs corresponding to a plurality of expressions respectively;

when a drag operation is detected after the user designates one graph on one graph display area, reducing a size of the one graph display area of the designated graph in response to the drag operation, and controlling the display unit to display the reduced graph display area of the designated graph with another graph display area of another graph; and when a reduction ratio of the reduced graph display area of the designated graph is smaller than a reduction ratio in a reducing time of the designated graph, generating an icon corresponding to the reduced graph display area and controlling the display unit to display the generated icon with another graph display area of another graph.

9. The storage medium according to claim 8, wherein:
the program causes the computer further to perform the following processes:
determining whether an object is designated on the graph display area by the user; and
when an object is determined to be designated, changing the coordinate range based on the designated object, thereby reducing or enlarging the graph in response to the drag operation, and controlling the display unit to display the reduced or enlarged graph.

10. The storage medium according to claim 8, wherein:
the program causes the computer further to perform the following process:
when a pinch-in operation or a pinch-out operation is detected after a position on the graph display area is designated by the user, changing the coordinate range with reference to the designated position, thereby reducing or enlarging the graph in response to the pinch-in operation or the pinch-out operation, and controlling the display unit to display the reduced or enlarged graph.

11. A graph display apparatus comprising:
a display unit that includes a touch panel; and
a processor that performs the following processes:
controlling the display unit to display a graph on a graph display area in a coordinate range, the graph corresponding to an expression;
acquiring a position designated by a touch of a user on the graph display area;
when a drag operation is detected after the touch of the user ends, changing the coordinate range with the designated position fixed in response to the drag operation, thereby reducing or enlarging the graph, and controlling the display unit to display the reduced or enlarged graph;
controlling the display unit to display a plurality of graphs on graph display areas in coordinate ranges, the plurality of graphs corresponding to a plurality of expressions respectively;
when a drag operation is detected after the user designates one graph on one graph display area, reducing a size of the one graph display area of the designated graph in response to the drag operation, and controlling the display unit to display the reduced graph display area of the designated graph with another graph display area of another graph; and
when a reduction ratio of the reduced graph display area of the designated graph is smaller than a reduction ratio in a reducing time of the designated graph, generating an icon corresponding to the reduced graph display area and controlling the display unit to display the generated icon with another graph display area of another graph.

* * * * *